United States Patent [19]

Vigh et al.

[11] 4,156,897
[45] May 29, 1979

[54] APPARATUS FOR SUPPLYING DIRECT CURRENT FROM A THREE-PHASE ALTERNATING-CURRENT SOURCE

[75] Inventors: József Vigh; Ferenc Flachner; László Gremsperger; Ferenc Csöllei, all of Budapest, Hungary

[73] Assignee: Villamos Berendezés és Készülék Müvek, Budapest, Hungary

[21] Appl. No.: 786,816

[22] Filed: Apr. 12, 1977

[51] Int. Cl.² .................................. H02M 7/06
[52] U.S. Cl. ................................. 363/126; 323/89 C; 336/12; 336/215
[58] Field of Search ............. 219/131 WR; 323/89 C; 336/5, 12, 215; 363/82, 87, 90, 91, 125, 126, 129, 130

[56] References Cited

U.S. PATENT DOCUMENTS

| | | |
|---|---|---|
| 2,265,930 | 12/1941 | Scott .......................... 219/131 WR |
| 2,628,340 | 2/1953 | Potter ............................... 363/82 |
| 2,702,887 | 2/1955 | Joublanc ............................ 336/5 |
| 3,102,976 | 9/1963 | Blair ...................... 219/131 WR X |
| 3,452,265 | 6/1969 | De Puy ............................. 363/129 |
| 4,030,017 | 6/1977 | Brown ......................... 363/126 X |

Primary Examiner—William M. Shoop

[57] ABSTRACT

Apparatus for supplying direct current from a three-phase alternating-current source, comprising a three-phase A.C. transformer; one end of each transformer phase leg being connected via separate yokes to corresponding ends of the other two phase legs, while the respective other ends are interconnected via a common yoke. Individual leg coils are provided on the legs of the thus formed core, while pairs of yoke coils are arranged on the separate yokes. Respective ends of all the yoke coils are interconnected in pairs, and their other ends are connected to input terminals of a six-pulse, three-phase half-wave rectifier unit.

6 Claims, 3 Drawing Figures

APPARATUS FOR SUPPLYING DIRECT CURRENT FROM A THREE-PHASE ALTERNATING-CURRENT SOURCE

BACKGROUND OF THE INVENTION

1. Field of the Invention

The invention concerns an apparatus for supplying direct current from a three-phase alternating-current source.

2. Description of the Prior Art

Rectifying apparatus for the supply of direct current (D.C.) consumers or loads generally consists of a mains tranformer or transformers, a rectifier unit and adjusting, regulating or control elements in the primary or secondary circuits.

The construction of these main units is rendered difficult by the disadvantageous effect of certain factors relating to their material and floor space requirements. The characteristic performance (rated output) of the transformer is determined not only by the circuit arrangements of the included rectifier and the rated (nominal) D.C. output, but also by the maximum D.C. output voltage required.

If the desired V-I characteristic of the rectifying devices has a flat and/or falling shape, i.e. a reducing D.C. output current is associated with a substantially higher D.C. output voltage than the D.C. voltage associated with the rated D.C. output, then the rated performance of the mains transformer of the rectifier equipment (i.e. the characteristic factor on which the material and floor space requirement of the transformer chiefly depends) is determined by a maximum D.C. output voltage at which the rated output of a transformer is consequently considerably higher than that of a transformer determined by the D.C. output voltage associated with the nominal D.C. current. Such a transformer therefore requires more floor space.

In some practical applications the need for an increase in the rated performance of the mains transformer has been obviated by the inclusion into the equipment of certain auxiliary supply units that provides the higher D.C. output voltage that goes with the lower D.C. output current.

This solution has led, however, to dividing the rated output of the equipment between two supply units, resulting, therefore, in no tangible advantage regarding material and floor space requirements.

One known way to overcome these difficulties is by the use of D.C. regulators. These are, however, rather complicated devices and their application is therefore limited.

Owing to their known practical advantages, rectifier units are often used in the form of a six-pulse three-phase half-wave circuit. Such rectifiers are fed by secondary coils connected to individual legs of an alternating current transformer. To achieve an economic operation of the semiconductors and to ensure longer current conduction times, and also the parallel current conduction of the semiconductors, saturable reactors are often built into the equipment. The regulating elements in the primary or secondary circuit are based on a magnetic working principle. Also, Triacs are widely used in the primary circuit, and so are controlled rectifying elements such as thyristors, namely in the secondary circuit.

The disadvantage of regulating elements being included in the primary and secondary circuits such as magnetic amplifiers is that they again require a large floor space.

SUMMARY OF THIS INVENTION

An object of the invention is the provision of an electric rectifier equipment with a flat and/or falling V-I characteristic curve, in which the higher D.C. output voltage coupled with a lower D.C. output current is achieved by a transformer of reduced output.

The task of the invention is to assure parallel current conduction of the semiconductors, i.e. an increase in the duration of the current conduction of the semiconductor elements that are included in the six-pulse three-phase halfwave rectifier equipment, without the use of a saturable reactor filter a further task is to reduce substantially the material and floor space requirements of the magnetically operated control elements built into the rectifier equipment.

The invention consists therefore of an electrical apparatus for supplying direct current from a three-phase A.C. source, which comprises an alternating-current transformer, and a rectifier unit with controlled and/or non-controlled rectifying elements as the main parts. The three phase legs of the three-phase transformer are arranged spatially in such a way that at least one end of each phase leg is connected to each end of the other two phase legs by means of individual yokes, while the other ends of the legs are interconnected by means of a common yoke. On the thus formed legs of the iron core structure, individual leg coils are arranged and on the individual yokes, pairs of yoke coils are arranged.

A three-phase-yoke coil system, formed by the leg coils can be embodied in a star, delta or a zigzag connection, the apparatus being provided with input terminals for connection to an alternating current mains.

The essence of the invention is therefore that a respective end of all the yoke coils is interconnected with each other preferably in pairs, and the respective other ends of all the yoke coils are connected to the input terminals of the other main part of the equipment namely to the mentioned rectifier unit, and these input terminals can serve for connecting of the alternating current mains supply.

According to the invention it has proven advantageous to interpose in a series connection a respective phase leg winding of a three-phase magnetic amplifier between the terminals of the phase-coil system formed by the legs and coils of the transformer, which are suitable for connection to an alternating current mains supply on the one hand, and the terminals of the alternating current mains network on the other hand.

The three legs of the three-phase magnetic amplifier iron core are spatially so arranged that at least one end of each of the phase legs is connected via separate yokes to the respective ends of the other two phase legs whilst the other ends of the legs are connected via a common yoke to each other. The leg coils are arranged on the legs of the iron cores created this way while exciter yoke coils suitable for the production of direct-current control are arranged on the separate yokes, which coils may be provided with a control or regulating organ.

The rectifier equipment embodied in the invention is capable of producing a V-I characteristic with a flat and/or falling curve even if a three-phase mains transformer of considerably reduced typical performance is employed. At the same time, a more favourable load on the semiconductor elements of the six-pulse three-phase half-wave rectifier can be achieved without using saturable reactors.

These advantages are derived from the fact that the invention utilizes yoke flux through the yoke coils. The equipment according to the invention makes it possible to establish a magnetic control function in the primary circuit i.e. a three-phase magnetic amplifier of a favorable design, coupled with a limited floor-space requirement.

From the point of view of achieving the aim of the invention, it is of particular advantage to exploit the identical or almost identical structure of the three-phase magnetic amplifier and the alternating current transformer of the equipment, since these two components form a common module or building block, in that each of the legs of the alternating-current transformer and of the three-phase magnetic amplifier are encompassed by a common leg coil. The three-phase coil system formed by these coils can be selectively connected to the alternating current mains in star (Y), delta or zigzag connection.

The three-phase primary coil system formed by the common coils performs not only the function of the working coils of the three-phase magnetic amplifier but also acts as primary coils of the alternating-current transformer. Naturally, the yoke coils are separate on the yokes of the magnetic amplifier and on those of the transformer.

The six-pulse three-phase half-wave rectifier included in the rectifier equipment may contain controlled, non-controlled, or partially controlled and partially non-controlled semiconductors.

The advantageous properties of the equipment to be herein described are not affected by the possible inclusion in the D.C. circuit of an inductance in series with the D.C. load.

BRIEF DESCRIPTION OF THE DRAWING

The invention is described, merely by way of example, with reference to the accompanying drawing which show a schematic circuit arrangement embodying the invention and comprising an electrical apparatus for supplying direct current from a three-phase alternating-current source, having a V-I characteristic with a flat and/or falling curve, wherein.

DESCRIPTION OF THE PREFERRED EMBODIMENT

Figure 1:
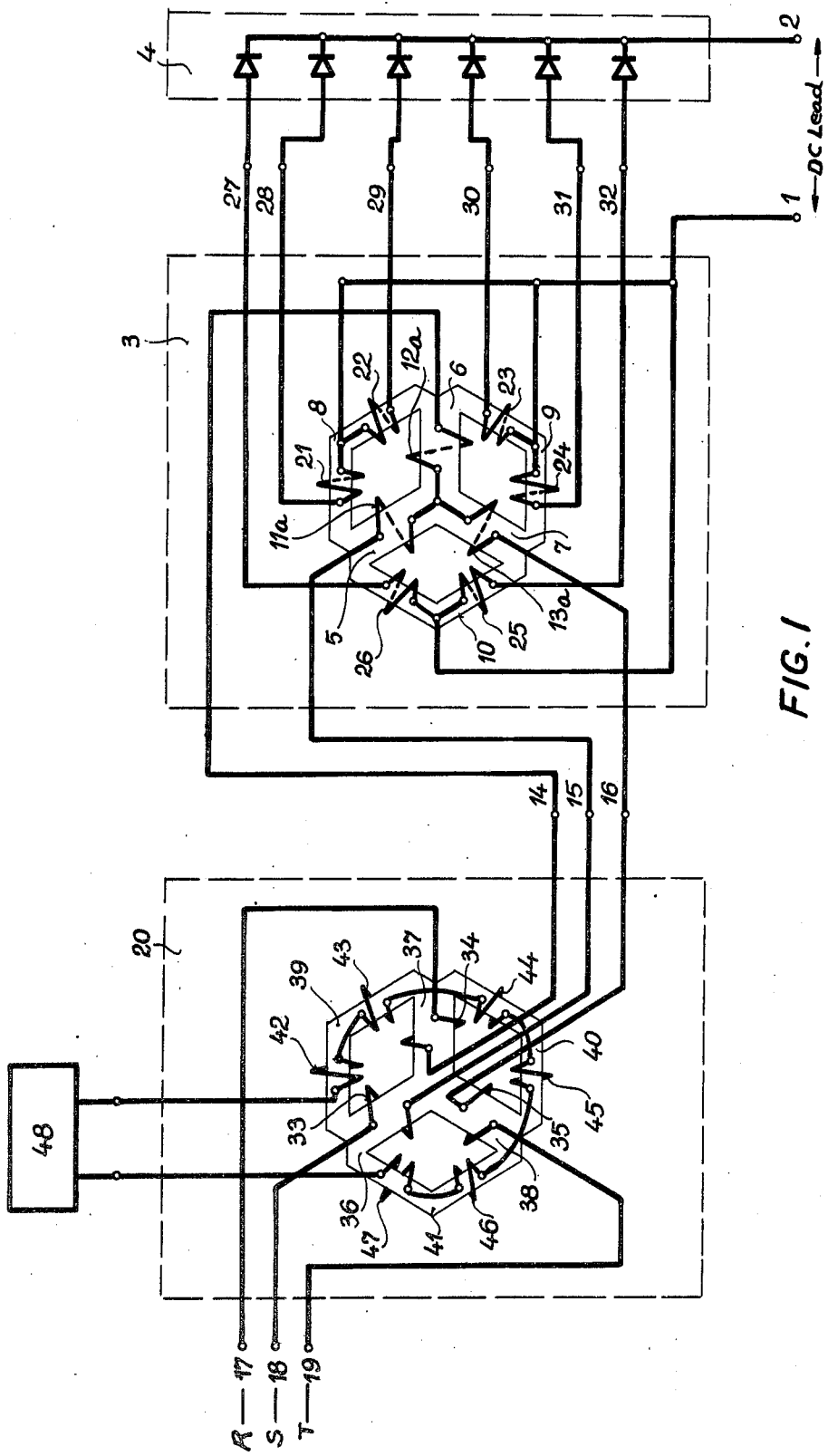
FIG. 1 shows an exemplary circuit arrangement of the inventive apparatus, comprising a transfromer, a rectifying unit and an optional magnetic amplifier, the transformer primary being connected in the star (Y) circuit.

In the apparatus according to the invention a direct-current load, e.g. an electric welding apparatus, an accummulator or other such load requiring a V-I characteristic having a flat and/or a falling curve can be connected to the output terminals 1 and 2.

The main parts of the apparatus enclosed in broken-line boxes are: an alternating-current transformer 3, a six-pulse three-phase half-wave rectifying unit 4 that includes rectifying elements, and a three-phase magnetic amplifier 20. A control or regulator unit 48 is schematically shown and will be described later when dealing with the circuit of the amplifier.

The legs or core sections 5, 6 and 7 of transformer 3 are so arranged spatially that the outer end of leg 5 is connected via discrete yokes 8, 10 to the respective outer ends of leg 6,7; similarly the outer end of leg 6 is connected via the yoke 8 and another discrete yoke 9 to the respective outer ends of legs 6, 5. The remaining (inner) ends of legs 5, 6, 7 are connected to each other by a common yoke portion. This is at the point of intersection of the three legs 5, 6 and 7.

Primary phase or leg coils 11.., 12.., 13.., to be described hereinafter, are alternatively shown in the three circuit diagrams of FIGS. 1, 2 and 3, namely in star (Y), delta and zigzag connection, which are of course known by themselves for three-phase A.C. circuits, In FIG. 1, leg coils 11a, 12a, 13a are wound respectively on the three legs 5, 6, 7 of the transformer 3 (actually in both FIGS. 1 and 2). These three coils 11a, 12a, 13a form in FIG. 1 a star-connected primary winding system for the transformer 3. Points 14, 15, 16 of the primary winding system may either be connected directly to an alternating current mains supply (not shown) or to the illustrated three-phase magnetic amplifier 20.

Ends of leg coils 33, 34, 35 of the magnetic amplifier 20 are connected to the terminals 14, 15, 16. The input sides of coils 33, 34, 35 are connected to terminals 17, 18, 19 of an alternating current mains supply (respectively identified by the conventional symbols R,S,T).

Secondary yoke coils 21, 22, 23, 24; as well as 25, 26 of transfiormer 3 are arranged in all three embodiments on the yokes 8, 9, 10; the yoke coils are interconnected in pairs at one end of each, while their other ends are always connected via input terminals 27, 28, 29, 30, 31, 32 to the rectifier unit 4, serving thus for connection to the alternating-current supply. Thus the A.C. voltages generated by induction in the secondary coils of transformer 3, that is, in the yoke coils 21 to 26, can be coupled to the rectifier unit 4 via its input terminals 27 to 32.

The structure of the iron core of the three-phase magnetic amplifier 20 formed by legs 36, 37, 38 and discrete yokes 39, 40, 41 is, in all embodiments, identical with the structure of the iron core of the transformer 3. Legs 36, 37, 38 carry the leg coils 33, 34, 35 which are the operative or working coils of the magnetic amplifier 20 and function as a primary-side control element for the mains transformer 3.

The magnitude of the primary-side control function is determined by the direct-current control exercised via series connected yoke coils 42 to 47 arranged on the yokes 39, 40, 41 and connected to the control or regulator unit 48.

Figure 2:
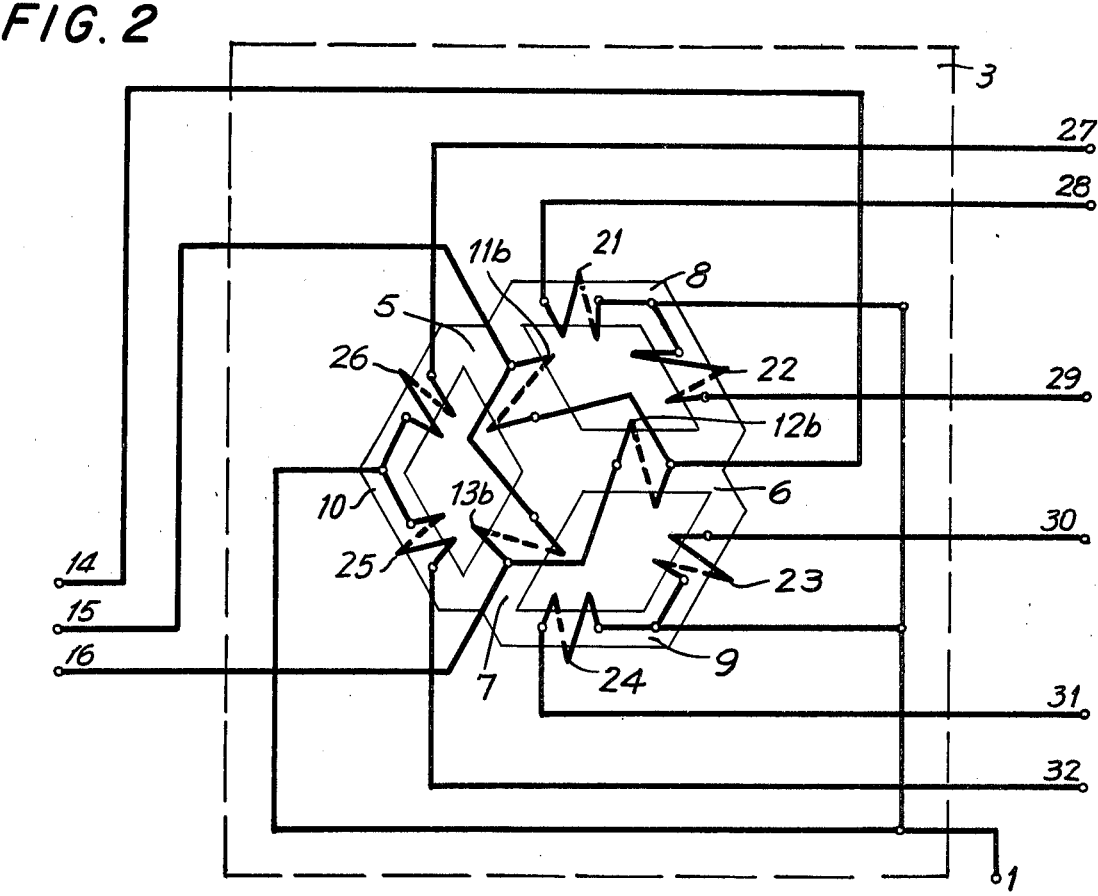
FIG. 2 is an almost identical but partical schematic arrangement of another exemplary apparatus wherein however the transformer has a delta connection.
Figure 3:
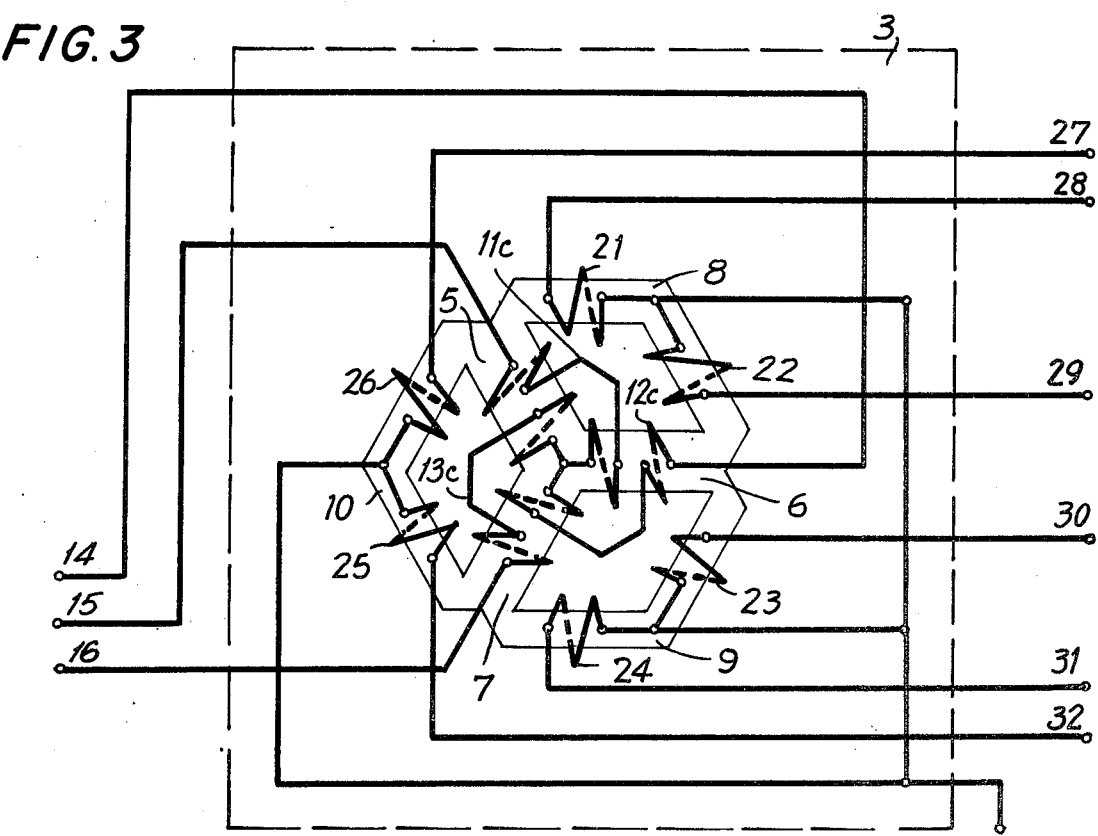
FIG. 3 is a further, partical modified apparatus, the transformer having a zigzag primary circuit.

It will be clear to those skilled in the art the circuit arrangements of FIGS. 1, 2 and 3 are essentialy identical, except for the primary winding sytem of the transformer 3 which has been described for FIG. 1 as being in the star (Y) circuit, with coils 11a, 12a and 13a, linked at their outer ends to respective terminals 15, 14, 16, and wound on the legs 5, 6 and 7, with their inner ends at a common zero point.

In the modification of FIG. 2, leg coil 11b, 12b and 13b are used in a different connection, leading at one end again to the points 15, 14 and 16, but their other ends go to the same terminals but in the sequence of 14, 16 and 15, in a delta circuit. There are no changes among the three disclosed embodiments in the secondary or rectifier circuits of the transformer 3, and/or in those of the optional magnetic amplifier 20.

Coming now to the third exemplary circuit diagram, that of FIG. 3, a so-called zigzag circuit is adopted, including modified leg coils 11c, 12c and 13c, each of which having two series-connected sections that run successively over or about the legs 5 and 6, 6 and 7, as well as 7 and 5, respectively, as can be seen, the inner ends being again at a common point. In all other respects the three exemplary electric circuit arrangements are identical.

What is claimed is:

1. Apparatus for supplying from a three-phase A.C. source direct current with a V-I characteristic that has an approximately flat curve, to achieve higher D.C. output voltages even at lower D.C. output currents, comprising: a three-phase A.C. transformer (3); a six-pulse, three-phase half-wave rectifier unit (4) including rectifying elements, as well as input (27 to 32) and output (1, 2) terminals, the latter for feeding a D.C. load; said transformer including a strictly symmetrical iron core constituted by a plurality of yokes (8 to 10) about phase legs (5 to 7) which latter are so arranged that one end of each leg is connected by means of separate ones of said yokes to respective other ends each of two other legs, while the respective other ends of said legs are all interconnected; individual primary coils (11.., 12.., 13..) provided each about at least one of said phase legs and having respective input terminals (14 to 16) for connection to the three-phase A.C. source; and secondary yoke coils (21 to 26) arranged in pairs (21/22, 23/24, 25/26) about said yokes, wherein respective one ends of said yoke coils are joined and the joints all lead to one (1) of said rectifier output terminals, while the other ends of said yoke coils are individually connected to said rectifier input terminals.

2. The apparatus as defined in claim 1, further comprising a three-phase magnetic amplifier (20) intercalated between said transformer primary input terminals (14 to 16) and the three-phase A.C. source (17 to 19), said amplifier including a strictly symmetrical iron core constituted by a plurality of yokes (39 to 41) about phase legs (36 to 38) which latter are so arranged that one end of each leg is connected by means of separate ones of said yokes to respective other ends each of two other legs, while the respective other ends of said legs are all interconnected; individual primary coils (33 to 35) provided about said phase legs, one end (17 to 19) of each coil being connected to the three-phase A.C. source while the other ends (14 to 16) lead to said transformer primary input terminals; D.C exciter yoke coils (42 to 47) arranged in pairs (42/43, 44/45, 46/47) about said yokes; and at least one control element (48) connected in series with all of said yoke coils; and wherein the circuits of said transformer and said magnetic amplifier, including all said coils, have strictly mechanically and electrically symmetrical set-ups.

3. The apparatus as defined in claim 2, wherein said A.C. transformer (3) and said magnetic amplifier (20) are at least partly united into a common module, so that said phase legs (5 to 7, 36 to 38) are both at least partly surrounded by all of said individual primary coils (11.., 12.., 13.., 33 to 35).

4. The apparatus as defined in claim 1, wherein said primary transformer coils (11a, 12a, 13a) are in a star (Y) circuit in that outer ends of said primary coils are respectively linked to said transformer primary input terminals (15, 14, 16) while their inner ends are joined at a common zero point.

5. The apparatus as defined in claim 4, wherein said primary transformer coils (11b, 12b, 13b) are in a delta circuit in that respective ends of said primary coils are bridged between different pairs (15/14. 14/16. 16/15) of said transformer primary input terminals (14 to 16).

6. The apparatus as defined in claim 1, wherein said primary transformer coils (11c, 12c, 13c) are in a zigzag circuit in that these coils each include two series-connected sections that run about different pairs (5/6, 6/7, 7/5) of said phase legs (5 to 7), outer ends of said primary coils being respectively linked to said transformer primary input terminals (15, 14, 16) while their inner ends are joined at a common zero point.

* * * * *